United States Patent
Esser et al.

(10) Patent No.: US 11,060,609 B2
(45) Date of Patent: Jul. 13, 2021

(54) METHOD FOR PRODUCING A PISTON RING

(71) Applicant: Federal-Mogul Burscheid GmbH, Burscheid (DE)

(72) Inventors: Peter Esser, Kuerten (DE); Steffen Hoppe, Overath (DE); Klaus Meyer, Wermelskirchen (DE)

(73) Assignee: FEDERAL-MOGUL BURSCHEID GMBH, Burscheid (DE)

( * ) Notice: Subject to any disclaimer, the term of this patent is extended or adjusted under 35 U.S.C. 154(b) by 60 days.

(21) Appl. No.: 16/610,747

(22) PCT Filed: Jul. 13, 2018

(86) PCT No.: PCT/DE2018/100643
§ 371 (c)(1),
(2) Date: Nov. 4, 2019

(87) PCT Pub. No.: WO2019/020143
PCT Pub. Date: Jan. 31, 2019

(65) Prior Publication Data
US 2020/0141492 A1 May 7, 2020

(30) Foreign Application Priority Data
Jul. 26, 2017 (DE) .......................... 102017007000.8

(51) Int. Cl.
*F16J 9/26* (2006.01)
*B23P 15/06* (2006.01)

(52) U.S. Cl.
CPC ................. *F16J 9/26* (2013.01); *B23P 15/06* (2013.01)

(58) Field of Classification Search
CPC ......... F16J 9/00; F16J 9/12; F16J 9/26; B23P 15/06
See application file for complete search history.

(56) References Cited

U.S. PATENT DOCUMENTS

| 9,352,427 B2 | 5/2016 | Esser | |
| 2010/0187766 A1* | 7/2010 | Lehnert | F16J 9/26 277/444 |
| 2012/0242047 A1* | 9/2012 | Sasaki | F16J 9/26 277/443 |

(Continued)

FOREIGN PATENT DOCUMENTS

| DE | 10221800 A1 | 12/2003 |
| DE | 102006003480 B3 | 7/2007 |

(Continued)

*Primary Examiner* — Gilbert Y Lee
(74) *Attorney, Agent, or Firm* — Norris McLaughlin, P.A.

(57) ABSTRACT

A piston ring is produced from a main body made of steel or cast steel and comprising a running face, an inner circumferential surface, upper and lower flank regions, and transition regions from the running face to the respective flank region, by coating the running face and the transition regions with a first chromium layer, removing this first chromium layer at the running face down to the base material of the main body, providing at least the running face of the layer-free main body with a nitride layer, and, finally, coating the running face and the transition regions with at least one further chromium layer.

8 Claims, 3 Drawing Sheets

(56) References Cited

U.S. PATENT DOCUMENTS

| | | | |
|---|---|---|---|
| 2015/0054222 A1* | 2/2015 | Herbst-Dederichs | C23C 8/04 277/443 |
| 2017/0016538 A1 | 1/2017 | Matos Cordeiro Costa et al. | |
| 2017/0108122 A1* | 4/2017 | Smith | F16J 9/26 |

FOREIGN PATENT DOCUMENTS

| | | |
|---|---|---|
| DE | 102011014483 B3 | 5/2012 |
| DE | 112015000949 T5 | 11/2016 |

* cited by examiner

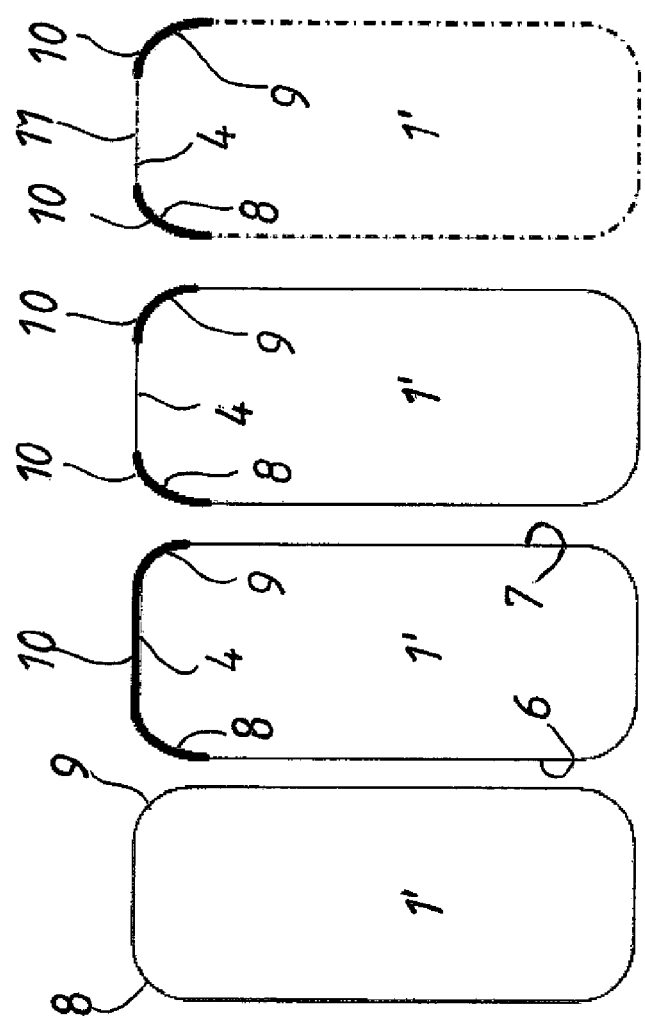

METHOD FOR PRODUCING A PISTON RING

The invention relates to a method for producing a piston ring made of steel or cast steel.

By way of a heat treatment process under a nitrogen atmosphere, a wear-resistant nitride layer can be generated on piston rings made of steel or cast steel, which, by virtue of the process, occurs on all free surfaces of the piston ring. Nitrided surfaces and, in particular, nitrided edges, which are subsequently chrome-plated, must be regarded as being more susceptible to chipping and cracks than the non-nitrided steel or cast steel base material having a chrome-plate running face.

DE 10 2006 003 480 B3 discloses a piston ring, comprising a running face, an upper flank, a lower flank, and an inner circumferential surface, wherein the upper flank is trapezoidally tapered at least partially in the direction of the inner circumferential surface, and the lower flank is provided with a surface layer generated by way of nitriding, in such a way that the trapezoidal region of the upper flank is designed to be nitride-layer-free, wherein a defined twisting in the operating state is generated by adaptation of the nitride layer thickness. A wear-resistant running face coating, which is generated by galvanic, chemical or physical deposition, is applied onto the running face provided with a nitride layer.

SUMMARY OF THE INVENTION

It is the object of the invention to provide a method for producing a piston ring made of steel or cast steel, with which chipping and cracks in the transition regions between the running face and the flank regions can be substantially avoided.

It is furthermore the object of the invention to provide a piston ring that has an optimized chipping and cracking behavior in the operating state, and in particular, in the transition regions from the running face into the respective flank surface.

The object is achieved by a method for producing a piston ring made of steel or cast steel by providing a main body, comprising a running face, an inner circumferential surface, upper and lower flank regions, and transition regions from the running face into the respective flank region, by coating the running face, including the transition regions, with a first chromium layer, by removing this first chromium layer in the region of the running face to the base material of the main body, by providing at least the running face of the layer-free main body with a nitride layer, and by finally coating the running face and the transition regions with at least one further chromium layer.

The object is also achieved by a piston ring, produced by the method according to the invention.

By the method according to the invention, that is to say by forming nitride-layer-free transition regions between the running face and the respective flank region, a piston ring is created which is not susceptible to chipping and cracks in these regions.

The first galvanically applied chromium layer is advantageously formed with a layer thickness of no more than 15 µm. After removal of this layer on the running face, the layer is preserved in the transition regions from the now layer-free running face in the respective flank region.

According to a further aspect of the invention, the nitride layer can be applied both to the running face (with the exception of the transition regions) and to at least one of the two flank regions, advantageously to both flank regions. This has a preferred layer thickness of >0 to 30 µm.

The at least one final chromium layer is galvanically formed with a layer thickness between 5 and 20 µm.

In this way, a piston ring is provided that, in the finished state, comprises a nitride layer, at least on the running face side, onto which a chromium layer is deposited, wherein the transition regions provided with a first chromium layer are provided to be nitride-layer-free.

BRIEF DESCRIPTION OF THE DRAWINGS

The subject matter of the invention is shown in the drawing based on an exemplary embodiment and is described below. In the drawings:

FIGS. 4 to 8 show schematic diagrams of the production method for a piston ring.

FIGS. 1 to 3 show schematic diagrams of piston rings 1, 2, 3, each including a main body 1', 2', 3'.

FIG. 1 shows a main body 1' designed as a rectangular ring, comprising a running face 4, an inner circumferential surface 5, an upper flank region 6, and a lower flank region 7. The transition regions 8, 9 from the running face 4 into the respective flank region 6, 7 are designed to be rounded in the present example, but can also extend conically, as needed.

FIG. 2 shows a main body 2' designed as a one-sided trapezoidal ring, which is designed analogously to claim 1, with the exception of the upper flank 6. Proceeding from the running face 4, the upper flank 6 is tapered in the direction of the inner circumferential surface 5.

FIG. 3 shows a main body 3' designed as a double trapezoidal ring, in which, in addition to the upper flank region 6, the lower flank region 7 is also tapered in the direction of the inner circumferential surface 5, proceeding from the running face 4.

It is also possible to provide main bodies having different cross-sections, as needed.

Figure 1:
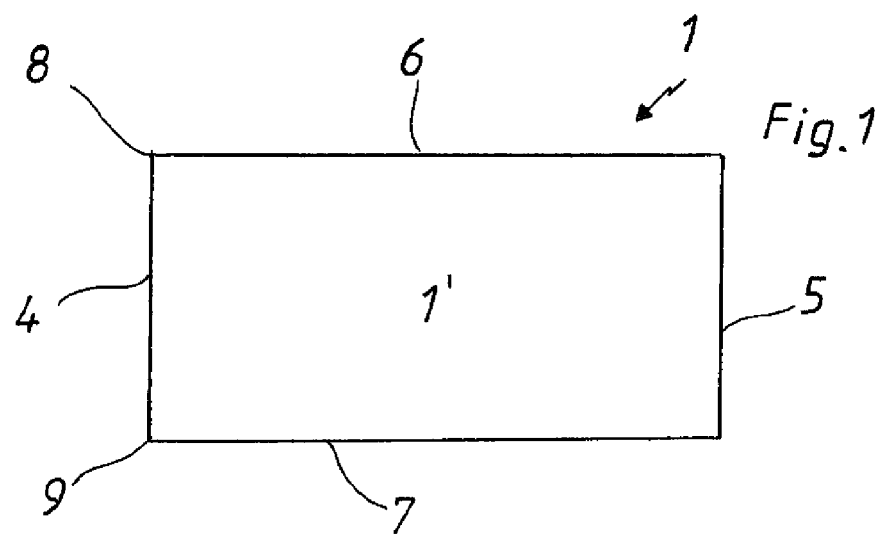
FIGS. 1 to 3 show schematic diagrams of piston rings (main body)
Figure 2:
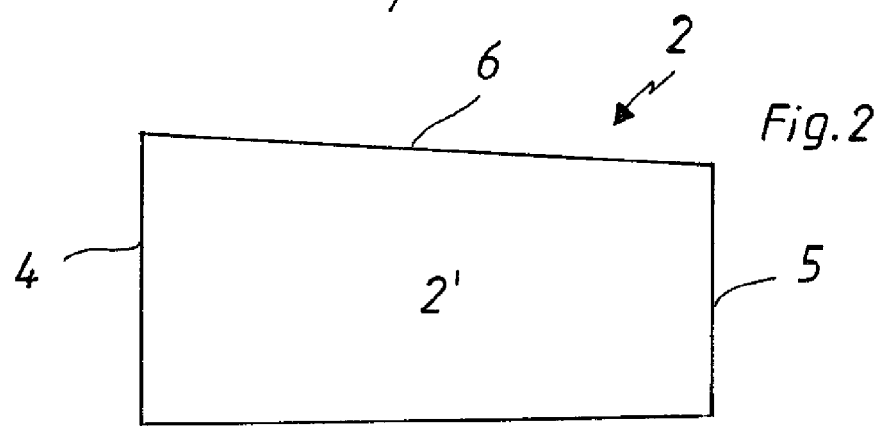
Figure 3:
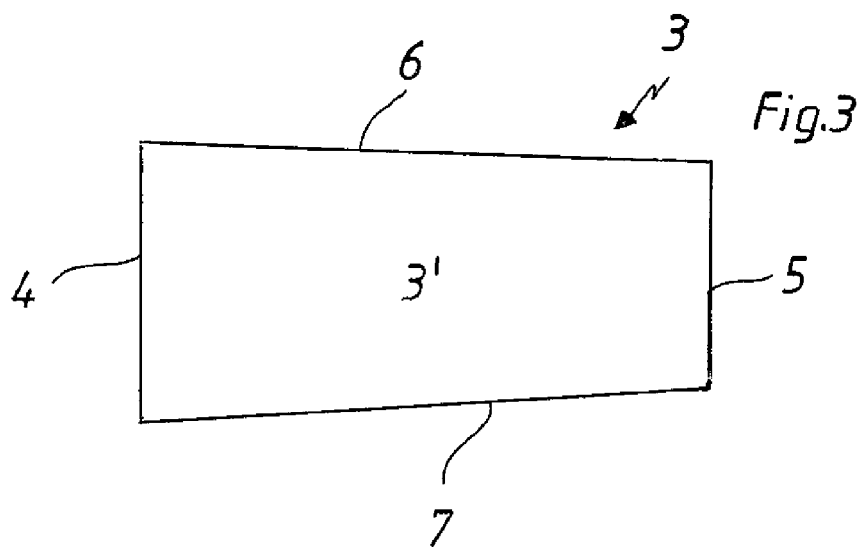

FIG. 4 only shows the main body 1' according to FIG. 1. The rounded transition regions 8, 9 are emphasized.

FIGS. 5 to 8 show the production method according to the invention, wherein the present example is based on the main body 1' according to FIG. 1.

DETAILED DESCRIPTION OF THE INVENTION

In a first manufacturing step (FIG. 5), the running face 4 and the transition regions 8, 9 from the running face 4 into the respective flank region 6, 7 are coated with a first chromium layer 10 having a layer thickness of 10 µm.

In a second manufacturing step, the chromium layer 10 is only removed in the region of the running face 4 to the base material of the main body 1' using suitable tools (FIG. 6), so that the original chromium layer 10 is only preserved in the transition regions 8, 9.

It is apparent from FIG. 7 that the running face 4 of the main body 1' is provided with a nitride layer 11 having a thickness of 10 µm, wherein the transition regions 8, 9, or the chromium layer 10 still located thereon, remain nitride-layer-free.

Figure 8:
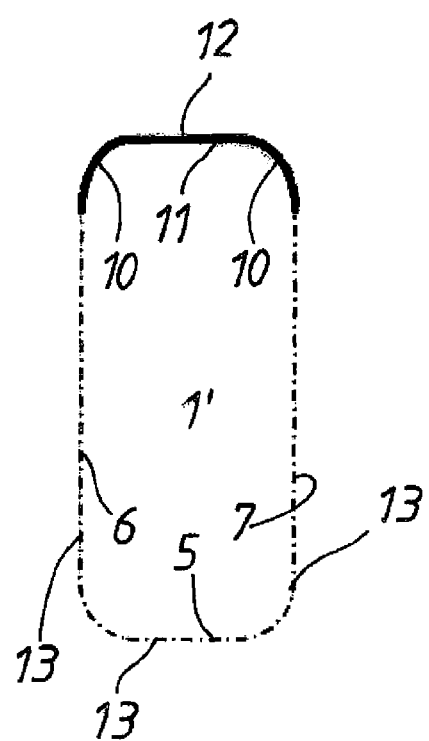

FIG. 8 shows a final manufacturing step, namely in which a further chromium layer 12 having a layer thickness of 15 µm is galvanically deposited onto the running face 4, or the nitride layer 11, and the first chromium layer in the transition regions 8, 9.

The piston ring thus finished can be used as a compression piston ring, for example, in the field of internal combustion engines. As a result of the targeted layer structure, in particular in the transition regions 8, 9 from the running face 4 into the respective flank region 6, 7, chipping and cracks can be avoided in these transition regions 8, 9 in the operating state.

It is also indicated in FIG. 8 that the flank regions 6, 7 and the inner circumferential surface 5 are provided with an additional circumferential nitride layer 13, wherein the nitride layer 13 ends before running into the respective transition region 8, 9.

The invention claimed is:

1. A method for producing a piston ring, comprising providing a main body made of steel or cast steel, the main body comprising a running face, an inner circumferential surface, upper and lower flank regions, and transition regions from the running face to the respective flank region, then coating the running face and the transition with a first chromium layer, removing this first chromium layer at the running face down to the steel or cast steel of the main body, then providing at least the running face with a nitride layer, and, finally, coating the running face and the transition regions with at least one further chromium layer.

2. The method according to claim 1, wherein the first chromium layer of a thickness no greater then 15 μm.

3. The method according to claim 1, wherein the providing at least the running face with the nitride layer comprises providing also at least one of the upper and lower flank regions with the nitride layer.

4. The method according to claim 1, wherein the nitride layer is of a thickness of >0 to 30 μm.

5. The method according to claim 1, wherein the further chromium layer of a thickness between 5 and 20 μm.

6. A piston ring, produced according to the method of claim 1.

7. A piston ring, comprising a main body made of steel or cast steel, the main body comprising a running face, an inner circumferential surface, upper and lower flank regions, and transition regions from the running face to the respective flank regions, on at least the running face a nitride layer overlaid with a chromium layer, and a chromium layer, but no nitride layer, on the transition regions.

8. The method according to claim 1, wherein the providing at least the running face with the nitride layer comprises providing also both the flank regions with the nitride layer.

* * * * *